US008611922B2

(12) United States Patent
Wigren et al.

(10) Patent No.: US 8,611,922 B2
(45) Date of Patent: Dec. 17, 2013

(54) MEASUREMENT SYSTEMS AND METHODS FOR FINGERPRINTING POSITIONING

(75) Inventors: Torbjörn Wigren, Uppsala (SE); Johan Bolin, Spånga (SE); Per Willars, Vaxholm (SE)

(73) Assignee: Telefonaktiebolaget L M Ericsson (Publ), Stockholm (SE)

( * ) Notice: Subject to any disclaimer, the term of this patent is extended or adjusted under 35 U.S.C. 154(b) by 110 days.

(21) Appl. No.: 12/864,023

(22) PCT Filed: Oct. 6, 2008

(86) PCT No.: PCT/SE2008/051126
§ 371 (c)(1),
(2), (4) Date: Jul. 22, 2010

(87) PCT Pub. No.: WO2009/096839
PCT Pub. Date: Aug. 6, 2009

(65) Prior Publication Data
US 2010/0317372 A1  Dec. 16, 2010

Related U.S. Application Data

(60) Provisional application No. 61/023,984, filed on Jan. 28, 2008.

(51) Int. Cl.
*H04W 24/00* (2009.01)
(52) U.S. Cl.
USPC ............... 455/456.1; 455/456.2; 455/457
(58) Field of Classification Search
USPC .................. 455/457, 456.1, 456.2
See application file for complete search history.

(56) References Cited

U.S. PATENT DOCUMENTS

| 2004/0132465 A1* | 7/2004 | Mattila et al. ............ 455/456.1 |
| 2005/0192024 A1* | 9/2005 | Sheynblat ............... 455/456.1 |
| 2010/0024045 A1* | 1/2010 | Sastry et al. ............... 726/28 |

FOREIGN PATENT DOCUMENTS

| EP | 1983786 A | 10/2008 |
| WO | 2007043915 A | 4/2007 |
| WO | 2007086784 A | 8/2007 |

OTHER PUBLICATIONS

International Search Report for PCT/SE2008/051126 mailed Mar. 6, 2009.
T. Wigren Adaptive Enhanced Cell-ID Fingerprinting Localization by Clustering of Precise Position Measurements; IEEE Transactions on Vehicular Technology, vol. 56, No. 5, pp. 3199-3209; Sep. 2007.

(Continued)

*Primary Examiner* — Olumide T Ajibade Akonai
*Assistant Examiner* — Michael Irace
(74) *Attorney, Agent, or Firm* — Potomac Patent Group PLLC

(57) ABSTRACT

A system, computer software and method for collecting, in addition to position data, additional positioning data in a user terminal served by a communication network. The method includes initiating, by generating a message within the user terminal, collection of the positioning data, where the positioning data includes information based on which a physical location of the user terminal is determined; measuring, by the user terminal, at least one parameter related to the physical location of the user terminal in response to the message; producing, within the user terminal, measurement reports that include the at least one parameter; selecting, within the user terminal, one or more measurement reports that were generated in response to the message generated by the user terminal; reporting the selected one or more measurement reports to an interface within the user terminal; and transmitting, from the interface, the reported one or more measurement reports to an external server or to the communication network.

25 Claims, 10 Drawing Sheets

(56) References Cited

OTHER PUBLICATIONS

A. Kangas, et al.; "Location Coverage and Sensitivity With A-GPS"; Ericsson AB, SE-164 80 Stockholm, Sweden; URSI EMTS 2004.

3GPP TS 25.331 V10.3.1 Apr. 2011 Technical Specification; 3rd Generation Partnership Project; Technical Specification Group Radio Access Network; Radio Resource Central (RRC); Protocol Specification (Release 10).

3GPP TS 43.059 V9.0.0 (Nov. 2009) Technical Specification; 3rd Generation Partnership Project; Technical Specification Group GSM/EDGE Radio Access Network; Functional stage 2 description of Location Services (LCS) in GERAN (Release 9); GSM Global System for Mobile Communications.

3GPP TS 44.031 V10.0.0 (Jun. 2010) Technical Specification; 3rd Generation Partnership Project; Technical Specification Group GSM/EDGE Radio Access Network; Location Services (LCS); Mobile Station (MS)—Serving Mobile Location Centre (SMLC) Radio Resource LCS Protocol (RRLP) (Release 10); GSM Global System for Mobile Communications.

EP Office Action dated Dec. 7, 2011 received in related Application No. EP 08 871 964.6.

\* cited by examiner

MEASUREMENT SYSTEMS AND METHODS FOR FINGERPRINTING POSITIONING

RELATED APPLICATION

This application is related to, and claims priority from, U.S. Provisional Patent Application Ser. No. 61/023,984, filed on Jan. 28, 2008, entitled "Measurement Systems and Methods for Fingerprinting Positioning" to T. Wigren et al., the entire disclosure of which is incorporated here by reference.

TECHNICAL FIELD

This application is related, generally, to communications systems, user terminals and methods and, more specifically, to positioning techniques, services, devices and software associated therewith.

BACKGROUND

Mobile handsets, and services on mobile handsets (mobile handset also refers to embedded devices in e.g. PCs, laptops, vehicles etc.) have had a rapid evolution during the last decade. When 3GPP standardized GSM, and later 3G during the late 1980's and 1990's, circuit switched telephony and later Short Message Service (SMS) were pretty much the only services available. Since then, mobile handsets and networks have evolved to create powerful devices capable of running both local applications and browser based services, connected to a network providing a bandwidth high enough for TV and interactive multimedia. With the increasing bandwidth, and need to provide a feasible technical platform and transport technology for multimedia services, packet-switched networks, e.g., using Internet Protocol (IP) as the fundamental technology, are becoming the dominating platforms for mobile services. There are a number of reasons why this trend is being supported by most actors in the communications business. One reason is that third parties will start to develop applications for such systems, and just as in the case with Internet, this will likely be a key to the expected success of next generation technologies. Another reason is that IP provides a technology platform where it is cheaper to deploy functionality. This is to a large extent due to economy of scale, as technology also used by the IT industry is cheaper than traditional telecom technology.

Another aspect of mobile systems and devices which has experienced significant growth over the last 10 years or so is positioning or location-based services, e.g., services and associated techniques and mechanisms for determining a current location of a mobile phone. Initially introduced to, for example, support emergency (e.g., E911) services, positioning techniques and services will likely be used for other purposes in the future.

Fingerprinting positioning algorithms operate by creating a radio fingerprint for each point of a fine coordinate grid that covers the Radio Access Network (RAN). The fingerprint may, for example, include: (1) the cell IDs that are detected by the terminal (e.g., mobile phone) for each grid point, including Cell IDs detected which belong to other public land mobile networks (PLMNs) than the present PLMN to which that terminal is connected, (2) cell information broadcast by base stations, (3) quantized path loss or signal strength measurements, with respect to multiple Radio Base Stations (RBSs), performed by the terminal, in at least a subset of the grid points, (4) quantized Round Trip Time (RTT, in wideband code division multiple acces (WCDMA)) or Timing Advance (TA, in GSM)), in each grid point, (5) quantized noise rise, representing the load of a CDMA system, in each grid point, (6) radio connection information, such as the radio access bearer (RAB), (7) quantized time. Using such information, whenever a position request arrives to the fingerprinting positioning function, a radio fingerprint is first measured, after which the corresponding grid point is looked up and reported. Naturally, the point to be reported should be unique, otherwise special procedures need to be applied.

The fingerprinted positions can be generated in several ways. For example, a first alternative would be to perform an extensive surveying operation that performs fingerprinting radio measurements repeatedly for all coordinate grid points of the RAN. The disadvantages of this approach includes: (1) the surveying required becomes substantial, even for small cellular networks, and (2) the radio fingerprints are, at least in some instants (e.g., those associated with signal strength and pathloss), sensitive to the orientation of the terminal, a fact that is particularly troublesome for handheld terminals. For fine grids, the accuracies of the fingerprinted positions therefore become more highly uncertain. This is unfortunately seldom reflected in the accuracy of the reported geographical shape.

Another approach, applied, e.g., in Adaptive Enhanced Cell IDentity positioning (AECID), is to replace the fine grid by high precision position measurements of opportunity, and to provide fingerprinting radio measurements for those points. This avoids the drawbacks of the first described fingerprinting technique, however it requires that algorithms for clustering of high precision position measurements of opportunity be defined and that algorithms for computation of geographical descriptions of the clusters be defined. More details regarding exemplary AECID techniques and mechanisms are provided below. Patent applications authored by T. Wigren, PCT/SE2005/001485 entitled "Adaptive Enhanced Cell Identity Positioning", and PCT/SE2006/000132, entitled "Path Loss Polygon Positioning", the disclosures of which are incorporated herein by reference, fully describe these techniques.

Recently, some service providers, e.g., Google, have initiated an alternative to conventional cellular positioning methods. Their approach is based on standardised interfaces (e.g., Java Micro edition, Symbian, Linux and Windows for Mobile) for applications in the cell phone. Such interfaces make it possible to access cell data, neighbour cell lists and the results of basic measurement information that is available in the mobile phone or terminal for other purposes. This alternative is further based on means to retrieve a reference position, typically using GPS or Assisted GPS (A-GPS) data, given the availability of such features in a sufficient number of phones. Basically, when a GPS (or A-GPS) positioning is performed, the interface is exploited in order to report available position related information to a server, e.g., owned and operated by the service provider. The so obtained GPS positions, together with the associated information available via the software interface, allows the service provider to, for example, build up globally valid mappings of cell ID/Network ID tagged with globally valid and accurate positions by correlating these bits of information in their server. Furthermore, corresponding neighbour cell relations can be constructed.

However, the present techniques are limited to the information that is available in the terminal device, i.e., information that was collected by the terminal device at the request of the RAN, and also to information that was obtained in the past, i.e., information that may be outdated.

Thus, for the positioning techniques, systems and methods which use the service provider controlled interfaces within the terminal device, as described above, it would be beneficial to obtain, and use, additional positioning related information.

SUMMARY

According to an exemplary embodiment, there is a method for collecting, in addition to position data, additional positioning data in a user terminal served by a communication network. The method includes initiating, by generating a message within the user terminal, collection of the additional positioning data, wherein the additional positioning data includes information based on which a physical location of the user terminal is determined; measuring, by the user terminal, at least one parameter related to the physical location of the user terminal in response to the message; producing, within the user terminal, measurement reports that include the at least one parameter; selecting, within the user terminal, one or more measurement reports that were generated in response to the message generated by the user terminal; reporting the selected one or more measurement reports to an interface within the user terminal; and transmitting, from the interface, the reported one or more measurement reports to an external server or to the communication network.

A user terminal configured to collect, in addition to position data, additional positioning data, the user terminal being served by a communication network. The user terminal includes a processor configured to initiate, by generating a message, collection of the additional positioning data, wherein the additional positioning data includes information based on which a physical location of the user terminal is determined, instruct a measuring unit to measure at least one parameter related to the physical location of the user terminal in response to the message, generate measurement reports that include the at least one parameter, instruct a selecting unit to select one or more measurement reports that were generated in response to the message generated by the user terminal, and report the selected one or more measurement reports to an interface within the user terminal. The user terminal also includes a transceiver connected to the processor and configured to transmit the reported one or more measurement reports to an external server or to the communication network.

According to still another exemplary embodiment, there is a computer readable medium for storing instructions, wherein the instructions, when executed by a processor, cause the processor to collect, in addition to position data, additional positioning data in a user terminal served by a communication network. The instructions include initiating, by generating a message within the user terminal, collection of the additional positioning data, wherein the additional positioning data includes information based on which a physical location of the user terminal is determined; measuring, by the user terminal, at least one parameter related to the physical location of the user terminal in response to the message; producing, within the user terminal, measurement reports that include the at least one parameter; selecting, within the user terminal, one or more measurement reports that were generated in response to the message generated by the user terminal; reporting the selected one or more measurement reports to an interface within the user terminal; and transmitting, from the interface, the reported one or more measurement reports to an external server or to the communication network.

BRIEF DESCRIPTION OF THE DRAWINGS

The accompanying drawings illustrate exemplary embodiments, wherein.

DETAILED DESCRIPTION

Figure 1:
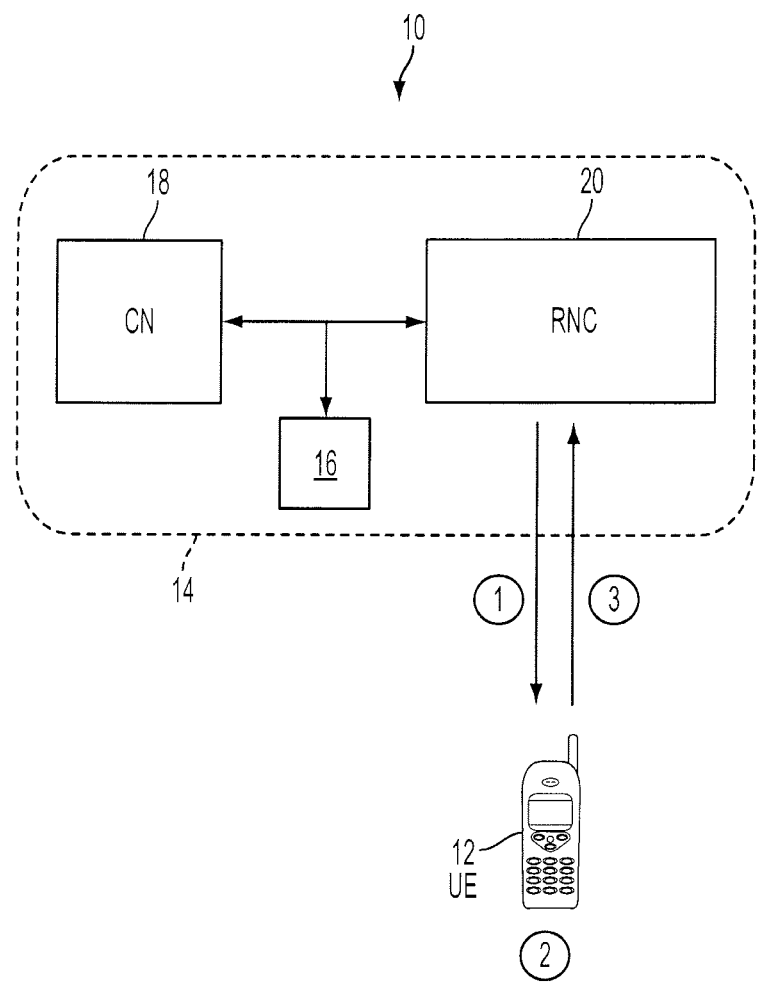
FIG. 1 illustrates a communication network.

The following detailed description of the exemplary embodiments refers to the accompanying drawings. The same reference numbers in different drawings identify the same or similar elements. Also, the following detailed description does not limit the invention. Instead, the scope of the invention is defined by the appended claims.

Reference throughout the specification to "one exemplary embodiment" or "an exemplary embodiment" means that a particular feature, structure, or characteristic described in connection with an embodiment is included in at least one embodiment of the present invention. Thus, the appearance of the phrases "in one embodiment" or "in an embodiment" in various places throughout the specification is not necessarily referring to the same embodiment. Further, the particular features, structures or characteristics may be combined in any suitable manner in one or more embodiments.

As described above, it is possible to exploit various interfaces in, for example, the cellular phone, e.g., Java Micro edition, Symbian, Linux and Windows for Mobile interfaces, that have access to cell IDs and position related measurement results like signal strengths, with respect to multiple RBSs. By correlating this information with high precision position measurements, e.g., from A-GPS, it becomes possible to create a global map of the cellular networks, which map is useful for various positioning purposes, e.g., advertising. In an exemplary embodiment shown in FIG. 1, this may be performed in a system 10 that includes the user terminal 12 and the communication network 14, by signaling the information and A-GPS positions from the terminal device 12 to a server 16, and performing correlations of the received information in the server 16.

More specifically, the system 10 shown in FIG. 1 may include a core network (CN) 18 and the RNC control 20. The RNC control 20 controls the interface of the user terminal 12 and initiate measurements of positioning information in step 1. The user terminal 12, in response to the instructions received from the RNC 20, starts to perform the required measurements in step 2. Then, the user terminal 12 reports the measurements back to the RNC control 20 in step 3. The RNC control 20 may use this information to detect a position of a user terminal or may transfer the information to a server 16, which is part of the communication network 14, to perform this operation. Alternatively, this operation can be performed in the user terminal 12, still under the control of RNC 20, followed by reporting the correlations themselves to the server 16 or 20.

However, there is additional position related information, i.e., other than cell IDs, signal strengths and Timing Advance (TA) information, that may be available in cellular phones (or other types of mobile devices) and that can be exploited for positioning purposes by an extended version of such interfaces according to these exemplary embodiments.

According to an exemplary embodiment, such additional position related information includes, for example, the result of SFN-SFN (System Frame Number) type 1 and/or 2 measurements on the WCDMA Common Pilot Channel (CPICH) pilot channel. For a discussion of these types of measurements see T. Wigren, PCT/SE2005/001485 entitled "Adaptive Enhanced Cell Identity Positioning", and PCT/SE2006/000132, entitled "Path Loss Polygon Positioning", the disclosures of which are incorporated here by reference. These SFN-SFN type 1 and 2 measurements, when combined, lead to the Observed Time Difference Of Arrival (OT-DOA(-IPDL Idle Period in the Downlink)) method for positioning. It may be the case that the sensitivity of the SFN-SFN measurement may not be enough for a stand alone implementation. However, it would nonetheless be beneficial to use the information in a fingerprinting method, as described below in more detail.

According to another exemplary embodiment, an additional position related piece of information which can be obtained is the result of Enhanced Observed Time Difference (E-OTD) measurements, i.e., relative time differences or absolute times from normal or dummy bursts sent by nearby pairs of BTSes, in the GSM system, see, e.g., TS 43.059, Functional Stage 2 description of LCD in GERAN, the disclosure of which is incorporated here by reference. The usage of this type of information can be the same as for SFN-SFN type 1 and 2 measurements.

According to another exemplary embodiment, another type of additional, position related information which can be obtained is the result of inter-Radio Access Technology (inter-RAT) measurements (cell ID and signal strength) from GSM on WCDMA and vice versa. Alternatively, the more recently specified LTE system could also be involved in such inter-RAT measurements.

Regarding the additional position related information discussed in the previous embodiments, it is noted that neither of the SFN-SFN type 1 and 2 measurements, the result of E-OTD measurements, or the result of inter-RAT are presently available at the above mentioned interfaces in exiting user terminals. In addition, the communication network, more specifically the RNC, is not configured to instruct the user terminals to detect this additional position related information. In other words, the additional position related information discussed above is not presently available by the user terminals. Thus, none of the existing fingerprinting methods disclosed in the background section are detecting the additional position related information. Further, none of the existing user terminals are configured to detect by themselves the additional position information.

Therefore, for using the additional measurements discussed above, an interface and/or functionality may be introduced, according to an exemplary embodiment, in the user terminal alone such that the interface instructs the user terminal to determine the additional measurements independent of the RNC, i.e., independent of any instructions received from the communication network. This interface/functionality may be implemented in software or a combination of software and hardware, as will be discussed later in more details. Thus, according to this exemplary embodiment, the user terminal 12 itself initiates and performs certain desired measurements without control from RNC 20.

For context, and purely as an exemplary embodiment, a brief discussion will first be provided of an exemplary AECID fingerprinting positioning method and associated WCDMA system, both of which can be used according to exemplary positioning embodiments. More details of this method can be found in T. Wigren, PCT/SE2005/001485 entitled "Adaptive Enhanced Cell Identity Positioning", and PCT/SE2006/000132, entitled "Path Loss Polygon Positioning". It will, however, be understood that the exemplary positioning methods and mechanisms disclosed herein are applicable to any fingerprinting positioning method and in any type of Radio Access Network (RAN). The AECID positioning method is based on the idea that high precision positioning measurements, e.g., A-GPS measurements, can be seen as points that belong to regions where certain cellular radio propagation conditions persist. In its simplest form, A-GPS measurements that are performed at the same time as a certain cell ID is valid, represent A-GPS measurements that fall within a specific cell of a cellular system. The AECID positioning method recognizes this and introduces a tagging of high precision measurements according to certain criteria including, e.g., (1) that the cell IDs that are detected by the terminal that performs the high precision position measurement, (2) quantized path loss or signal strength measurements, with respect to multiple RBSs, performed by the terminal that performs the high precision position measurement, (3) quantized Round Trip Time (RTT, in WCDMA) or Timing Advance (TA, in GSM), (4) quantized noise rise, representing the load of a CDMA system, (5) radio connection information like the radio access bearer (RAB), and (6) quantized time. The tags used in such AECID positioning methods typically include a vector of indices, each index taking an enumerable number of discrete values. Thus, continuous variables used for tagging, such as path loss, need to be quantized.

The second step of the AECID positioning method is to collect all high precision positioning measurements that have the same tag in separate high precision measurement clusters, and to perform further processing of that cluster in order to refine it. It is clear that each such cluster includes high precision position measurements collected from a region with similar radio conditions—hence the measurements are normally from the same well defined geographical region. More specifically, such geographical regions are normally substantially smaller than the extension of a cell of the cellular system. In a third step of the AECID positioning method, a polygon that represents the geographical extension of a cluster is computed, for each stored high precision position measurement cluster. Two of the properties of such algorithms include, for example, that the area of the polygon is minimized (accuracy hence maximized) and that the probability that the terminal is within the polygon (the confidence) is precisely known (it is set as a constraint in the algorithm).

Figure 2:
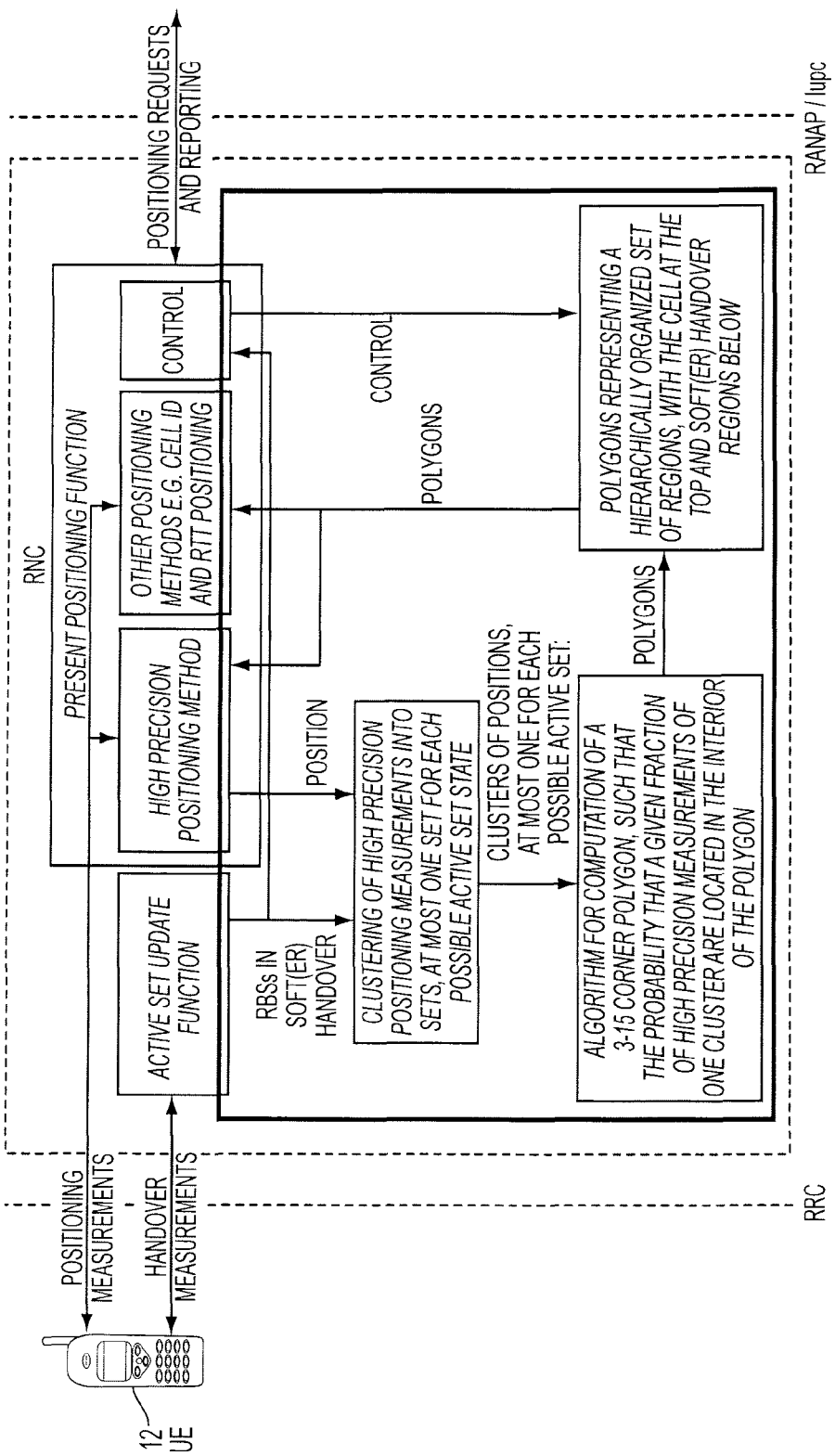
FIG. 2 illustrates steps performed according to the Adaptive Enhanced Cell Identity positioning.

Thus far, exemplary steps towards the creation of a tagged database of polygons have been described. An AECID position can now be determined by a first determination of the persisting tag. This determination can be performed by looking up cell IDs, by performing auxiliary measurements and by looking up auxiliary connection information, as described above. The polygon corresponding to the determined tag is then looked up in the tagged database of polygons, followed by a reporting, e.g., over RANAP, using the polygon format. FIG. 2 illustrates an exemplary block diagram for handling this AECID processing in the RNC.

As mentioned above, high precision positioning methods are used in such AECID positioning methods. In this context, high precision positioning methods can be considered as those which have the potential to meet, e.g., the North-American E-911 emergency positioning requirements. Methods that meet these requirements are capable of obtaining positioning accuracies of either (terminal based) to within 50 meters (67% of the time) and to within 150 m (95% of the time), or (network based) to within 100 meters (67% of the time) and to within 300 m (95% of the time).

Assisted GPS (A-GPS) positioning is an enhancement of the global positioning system (GPS) and is one such high precision positioning technique which can be used to generate data points for AECID. An example of a A-GPS positioning system is displayed in FIG. 3. In this figure, GPS reference receivers 22 attached to, e.g., a cellular communication system 10, collect assistance data that, when transmitted to GPS receivers in user terminals 12 connected to the cellular communication system 10, enhances the performance of the GPS terminal receivers 12. Typically, A-GPS accuracy can become as good as 10 meters also without differential operation. The accuracy becomes worse in dense urban areas and indoors, where the sensitivity is most often not high enough for detection of the very weak signals from the GPS satellites.

Figure 3:
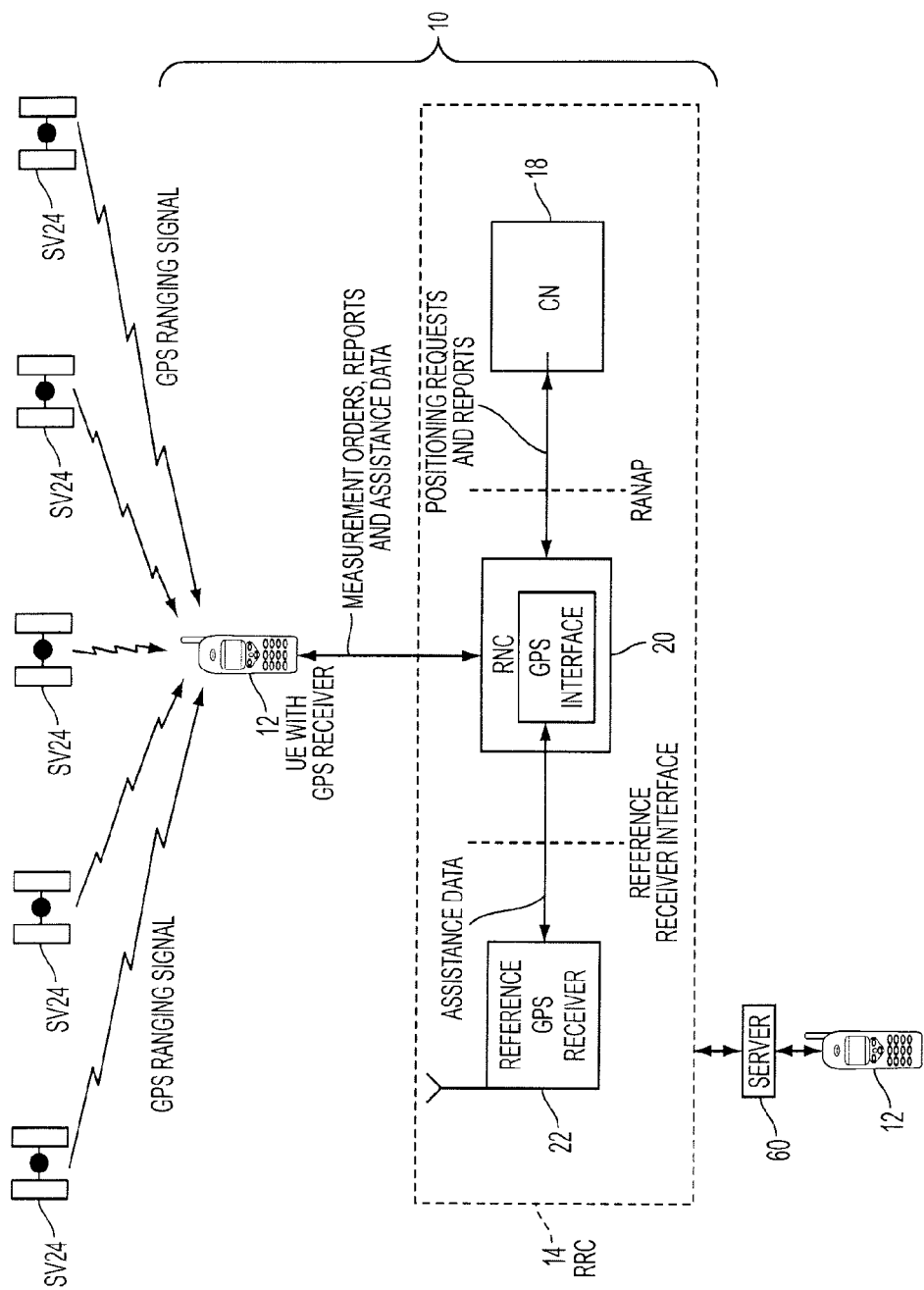
FIG. 3 illustrates a communication network that uses A-GPS.

In the example of FIG. 3, the A-GPS is implemented in a WCDMA system. In this system, the RNC controller 20 acts as the node that collects, refines and distributes assistance data to the user terminals 12. The core network CN 18 requests positioning of the user terminal 12 over the radio access network application part (RANAP) interface. In response, the RNC 20 may use various kinds of A-GPS techniques, all of which will typically, however, build on assistance data being handled by a node in the cellular communication system. The RNC 20 orders positioning measurements to be performed in the user terminal 12, measurements that are performed by dedicated A-GPS receiver hardware in the user terminal 12. These receivers detect GPS transmissions from the satellites that are also denoted space vehicles (SVs) 24.

Similar to A-GPS, the Uplink Time Difference Of Arrival (UTDOA) positioning method is another high precision positioning technique which is based on time of arrival measurements. However, in the UTDOA case measurements of transmissions from the user terminals are performed in several RBSs. An advantage with UTDOA as compared to A-GPS is the fact that the signal strengths are higher, something that enhances the ability to perform positioning indoors. The accuracy of UTDOA is expected to be worse than that of A-GPS though, mainly because the radio propagation conditions are worse along the surface of the earth than when GPS radio signals are received from satellites at high elevation angles. For various reasons UTDOA is also an expensive technology to deploy. There is also a counterpart to UTDOA specified in 3GPP which operates in the downlink, i.e., measurements of time of arrivals of radio signals transmitted by several RBSs are performed in the user terminal. In practice this OTDOA-IPDL method unfortunately lacks the sensitivity to provide useful high precision performance.

As mentioned above, various problems with the existing technology, that are solved by these exemplary embodiments include: (1) the availability of only a limited amount of positioning information over the described interfaces within the terminal (or other similar cellular phone interfaces) which thereby limits the accuracy of the fingerprinting positioning as performed by service providers, and (2) a present lack of well defined cellular phone functionality for: (a) initiation of position related additional measurements and (b) reporting of such additional, position related measurement results, to the interface of the user terminal, instead of reporting over the air-interface to the RAN.

According to an exemplary embodiment, initiating additional position related measurement in the user terminal may be achieved by creating software (SW) that mimics the radio resource control (RRC) interface (for the WCDMA example), i.e., that injects a message in the received stream of messages from the RAN to the user terminal 12. The additional position measurements may be performed by the user terminal in addition to the GPS and/or A-GPS position information discussed above. According to an exemplary embodiment, the user terminal may be configured to determine the position information (GPS and/or A-GPS) simultaneously with the additional position information. However, these measurements may be performed sequentially. Further, according to another exemplary embodiment, the results of the measurements for position information and additional position information may be send together or separately from the user terminal to the server. In WCDMA this could, for example, be a MEASUREMENT CONTROL message. In a GSM use case similar messages would be added in Radio Resource Link Protocol (RRLP). According to another exemplary embodiment, it is possible to couple the measurement functionality directly to the interface of the user terminal 12. The advantage with the above solution is that existing functionalities, available in the existing user terminals that are standard compliant, can be re-used. In the GSM case the functionality would use Location Services (LCS) and measurement capabilities in either the control plane (typically using RRLP) or the user plane (typically using OMA SUPL).

Figure 4:
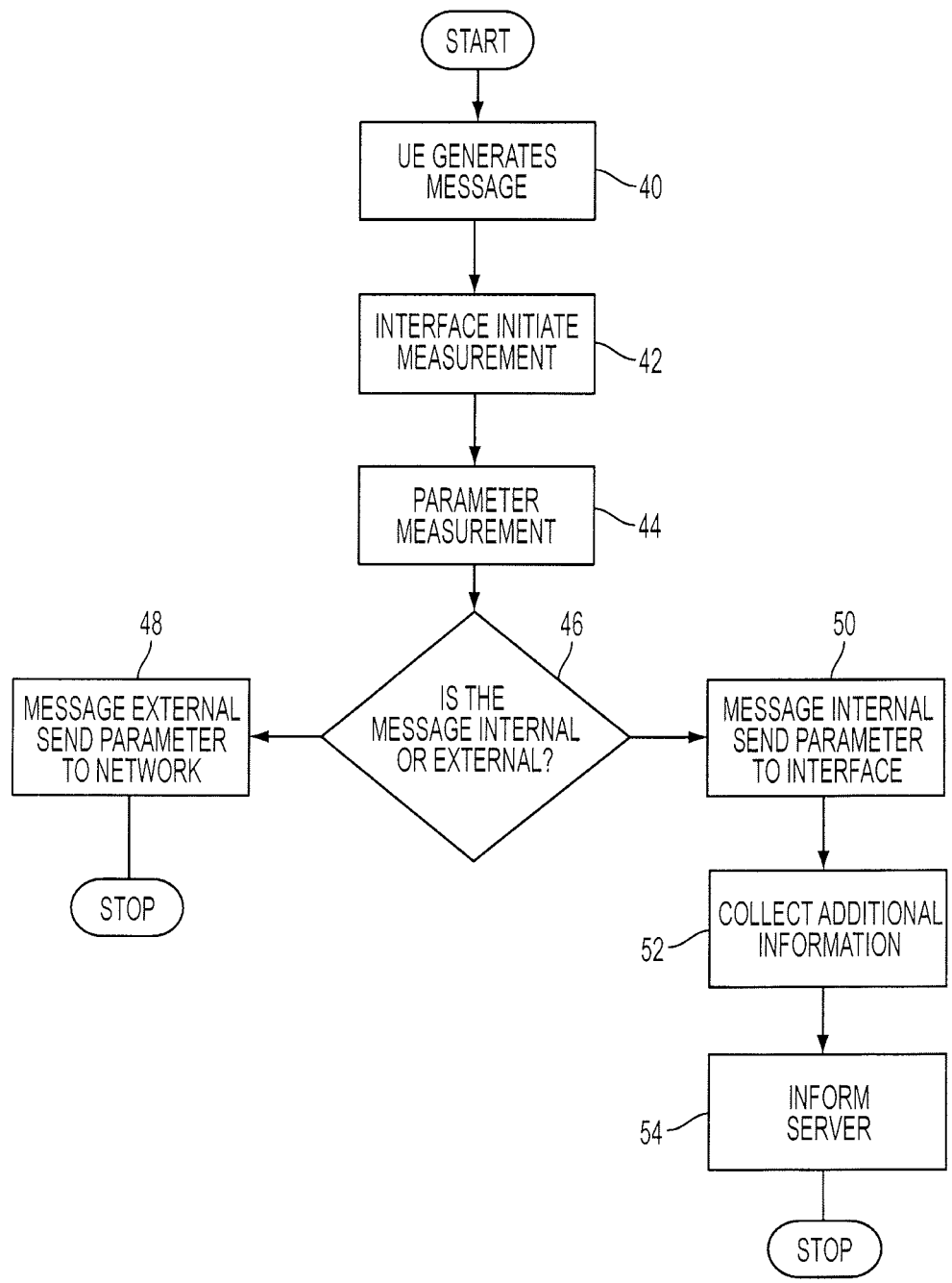
FIG. 4 is a flow chart illustrating steps performed for determining fingerprinting data according to an exemplary embodiment.

Thus, according to an exemplary embodiment shown in FIG. 4, a method for achieving the functions described above is described. In step 40, the user terminal 12 generates a message that requests the measurement of a certain parameter. An interface (that will be discussed later) of the user terminal, based on the generated message, initiates in step 42 the measurement of the parameter. In one exemplary embodiment, the message is generated by the interface. Based on the request from the interface, other modules of the user terminal perform the actual measurement of the requested parameter in step 44. The interface may detect in step 46, whether the message was generated within the user terminal or was received from the RNC 20 of the communication system 14. If the message was received from outside the user terminal 12, then the interface may send the measured corresponding parameter to the RNC 20 in step 48. However, if the message was received from within the user terminal 12, for example from the interface, then the measured parameter is sent in step 50 to the interface. The interface may collect, in an optional step 52, further information related to the position of the user terminal, and the measured parameter and this information are sent in step 54 from the user terminal to a server, that might be part of the communication system 14 or may be external to the communication system 14.

Figure 5:
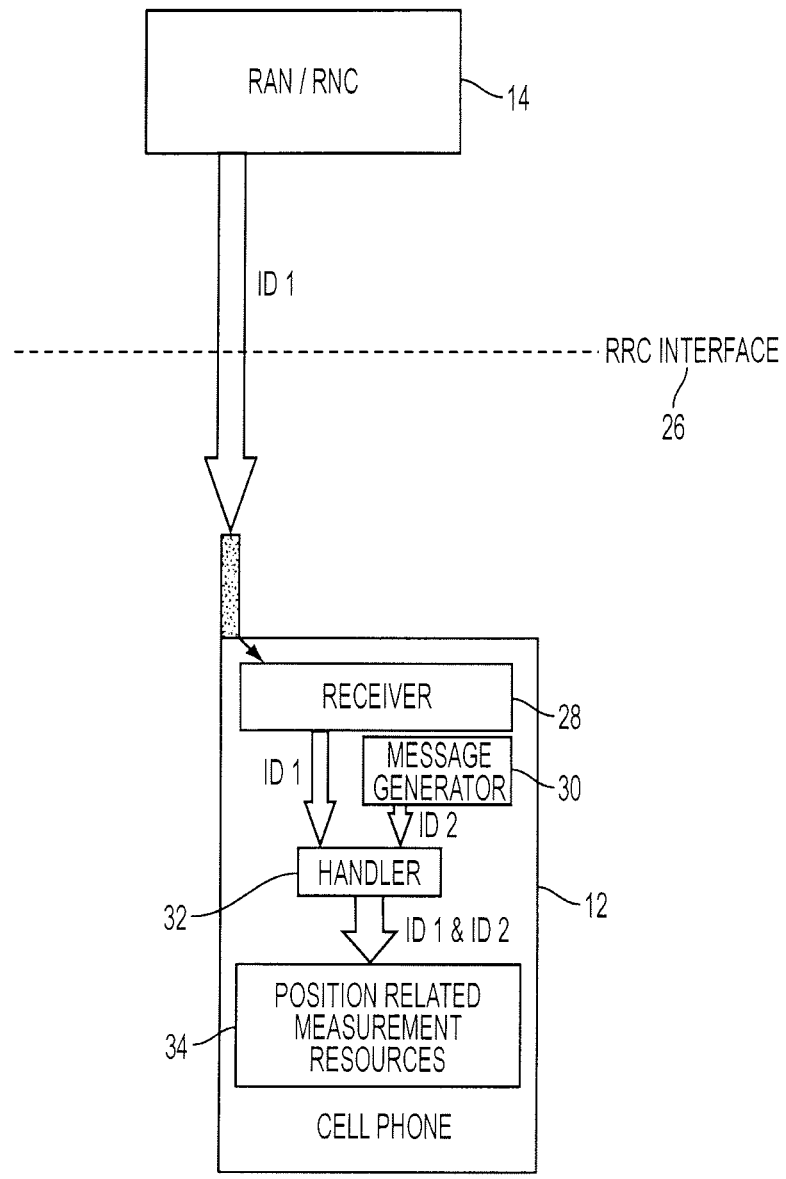
FIG. 5 is a schematic diagram illustrating how messages from outside and inside the user terminal are handled according to an exemplary embodiment.

FIG. 5 illustrates the initiation of the additional measurement reports by a user terminal according to an exemplary embodiment. FIG. 5 shows that the RAN/RNC 14 sends a first message, containing an identifier ID1, to the user terminal 12. A receiver 28, which might be a transceiver, within the user terminal 12 may receive the first message. The first message and a second message generated by a message generator 30, also within the user terminal 12, are provided to a handler 32. The second message may include a different identifier 102, which is reserved only for messages generated within the user terminal 12. The handler 32 receives the messages with identifiers ID1 and ID2 and instructs a position related measurement unit 34 to perform the measurements requested by the first and second messages.

Figure 6:
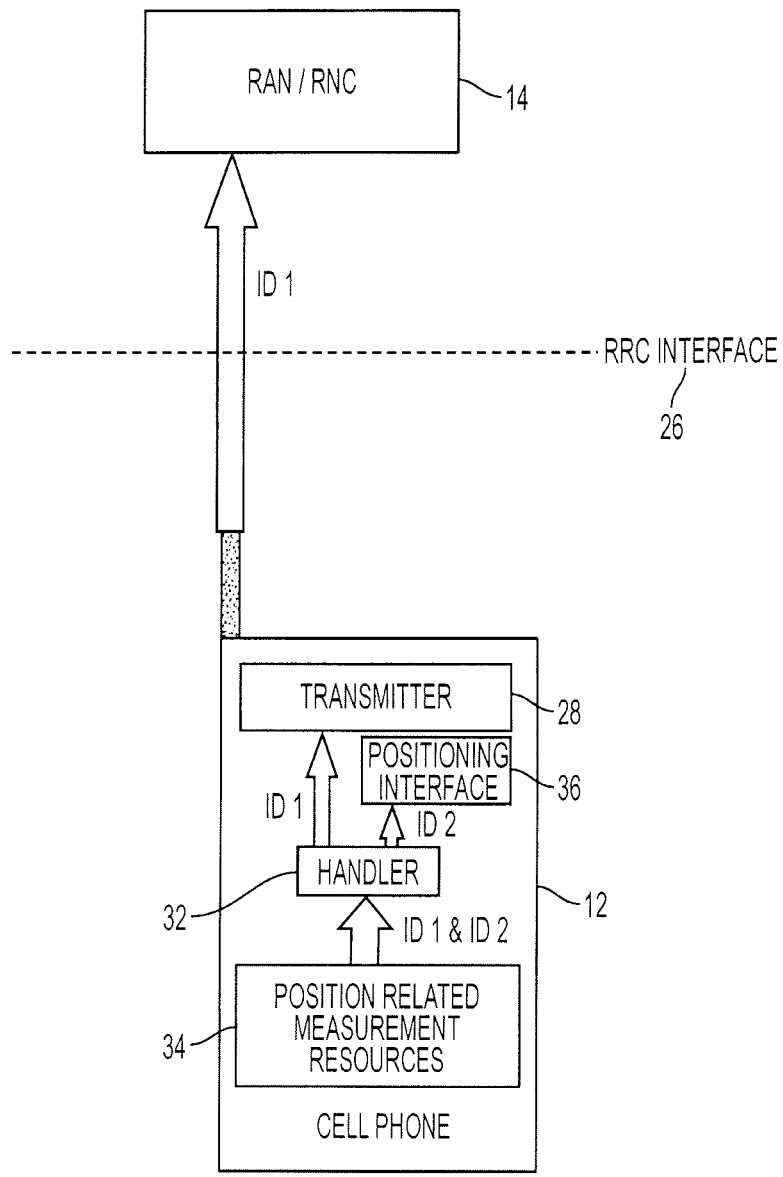
FIG. 6 is a schematic diagram illustrating how measurements performed in response to the received messages are handled in the user terminal according to an exemplary embodiment.

According to an exemplary embodiment, a mechanism that directs reports carrying position related measurement reports, e.g., including some or all of the additional position related information described above, to a software instance that is connected to the interface within the user terminal is discussed with reference to FIG. 6. Only reports which correspond to measurements initiated from the user terminal, should be directed to this software instance. Hence a mechanism that distinguishes between the source of measurement orders (i.e., RAN or user terminal) may also be provided. In WCDMA, one such mechanism is available in terms of the measurement Id of the MEASUREMENT CONTROL messages. So one dedicated measurement Id2 could be reserved for user terminal initiated measurement orders of position related information. In GSM, RRLP offers a set of messages and functionality intended for or useful to determine the handset's location, such as measurements for E-OTD and A-GNSS. FIG. 6 illustrates an example of reporting such measurements, some back to the RAN and others toward a dedicated SW instance of the cellular phone, in this case the positioning interface itself.

More specifically, FIG. 6 shows how the position related measurement resources 34 provides the measured parameters to handler 32, where reports including the measured parameters include the identities ID1 and ID2. The handler 32 may include a selection unit 62, discussed later and shown in FIGS. 7 and 8, that determines based on, for example, preset rules, that reports including ID1 should be sent to the RAN/RNC 14 while reports including ID2 should be sent to the interface 36. In other words, this selection unit may perform the function described in step 46 in FIG. 4. The transmitter 28 transmits the measured parameter associated with ID1 to the RAN/RNC 14 but not the measured parameter associated with ID2. In one exemplary embodiment, the transmitter 28 may be configured to transmit the measured parameter associated with ID2 to an external server 60.

Figure 7:
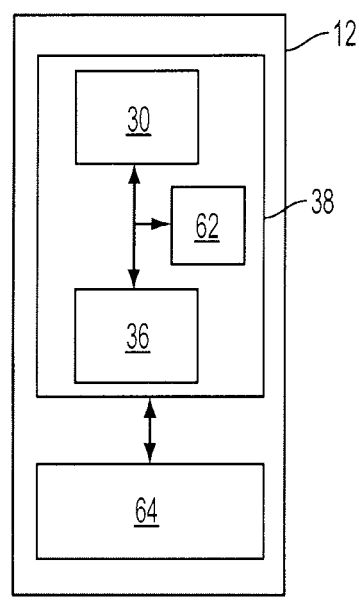
FIG. 7 is a schematic diagram of an interface of the user terminal according to an exemplary embodiment.

The interface 38 discussed above is shown in FIG. 7 as including, for example, the message generator unit 30, the positioning interface 36, and the selecting unit 62. The functions of these units may be implemented, according to an exemplary embodiment, by a software instance that may be run on the computing configuration shown in FIG. 8. FIG. 7 also shows that the interface 38 is fully inside the user terminal 12 and communicates with other parts 64 of the user terminal. Thus, a technical effect of such computing configuration is the internal generation of messages for requesting specific position related measurements.

Figure 8:
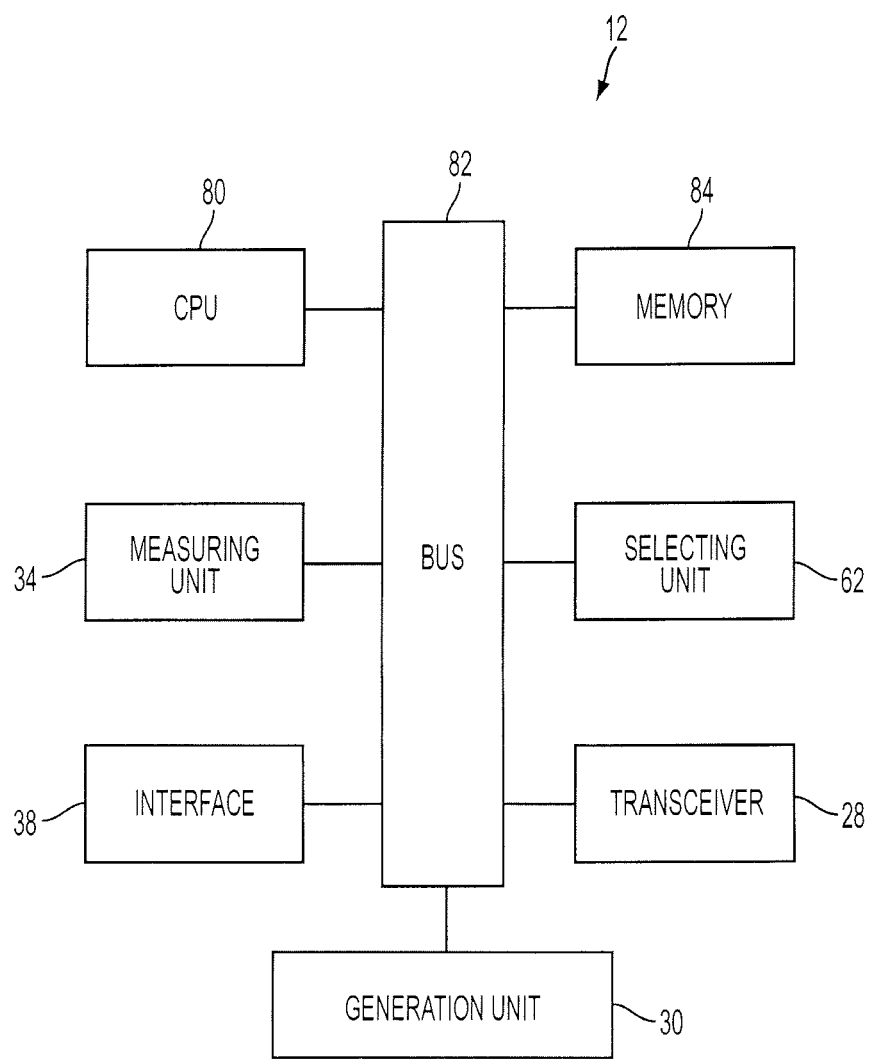
FIG. 8 is a schematic diagram of the user terminal.

FIG. 8 shows a schematic diagram of the user terminal 12. The user terminal may include a CPU 80 connected via a bus 82 to a memory 84. The user terminal may include a measuring unit 34, that measures the parameters requested by the first and/or second messages, the selection unit 62, the interface 38, the transceiver 28 and the generation unit 30 discussed above.

According to another exemplary embodiment, one or more extensions to the interface 38 within the terminal 12 are possible in order to make the additional position related information available for transmission, e.g. to a server 60 on the internet, external to the RAN, as shown in FIG. 3. These interface extensions can include at least the three different types of additional position related information described above.

Thus, it will be appreciated that the exemplary embodiments provide user terminal functionality for initiation of additional position related measurements from the user terminal itself, reporting of additional position related measured results, to an instance of the user terminal itself, making the additional position related information available at an interface discussed above, within the user terminal itself and mechanisms for signaling of the additional position related information, e.g. to a server residing somewhere on the Internet or a unit of the communication network. The additional position information may be signaled transparently, as a bit stream that is not decoded until it reaches the server, i.e., the end user. In this case the communication network is completely unaware of the positioning information transfer that takes place. Based on this information, i.e., position information and additional position information, the server may build a database that maps positions in the grid with the reported measurements of the user terminals. Based on this database, the server is able to identify the location of a user terminal when that user terminal sends the additional position relation information to the server and/or conventional positioning information by searching which point of the grid in the database has the same additional and/or conventional position relation information.

Figure 9:
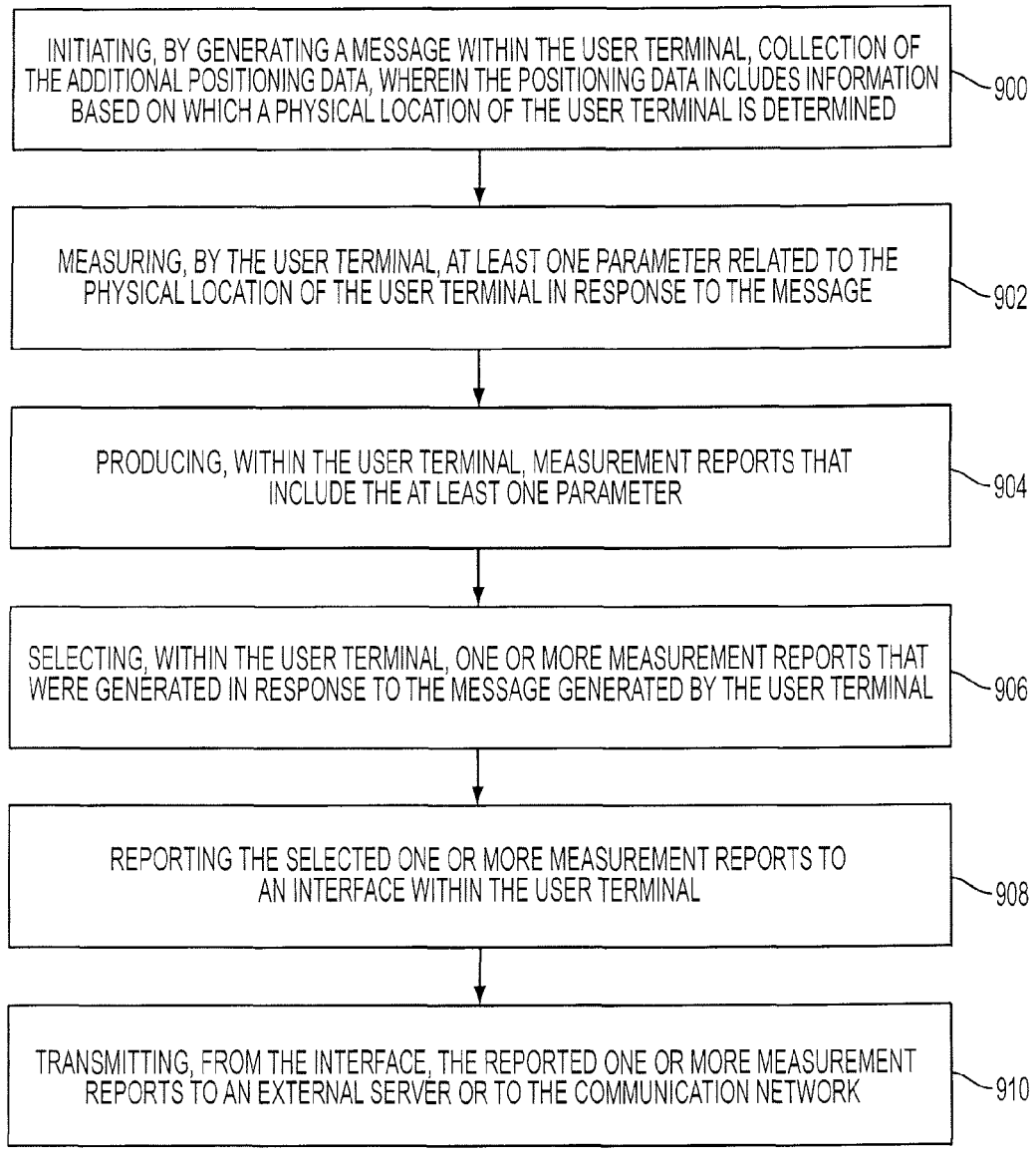
FIG. 9 is a flow chart illustrating steps for collecting positioning data according to an exemplary embodiment.

According to an exemplary embodiment illustrated in FIG. 9, there is a method for collecting, in addition to position data, additional positioning data in a user terminal served by a wireless communication network. The method includes a step 900 of initiating, by generating a message within the user terminal, collection of the additional positioning data, wherein the additional positioning data includes information based on which a physical location of the user terminal is determined, a step 902 of measuring, by the user terminal, at least one parameter related to the physical location of the user terminal in response to the message, a step 904 of producing, within the user terminal, measurement reports that include the at least one parameter, a step 906 of selecting, within the user terminal, one or more measurement reports that were generated in response to the message generated by the user terminal, a step 908 of reporting the selected one or more measurement reports to an interface within the user terminal, and a step 910 of transmitting, from the interface, the reported one or more measurement reports to an external server or to the communication network.

Figure 10:
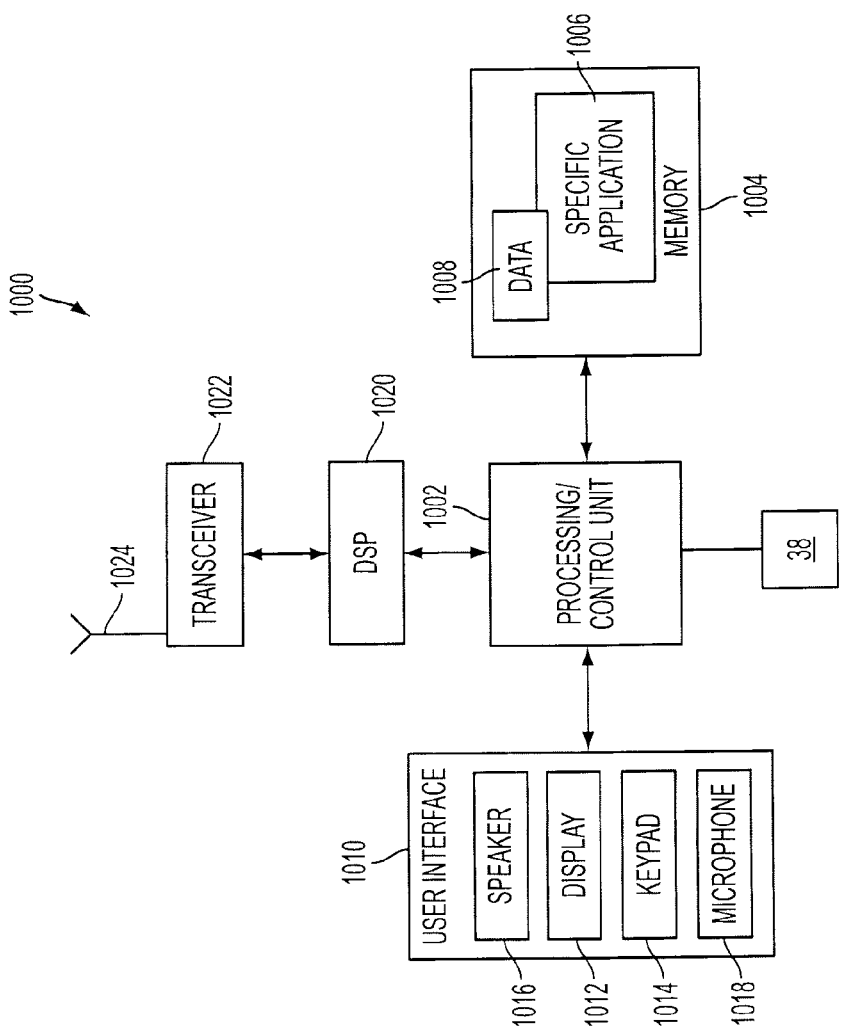
FIG. 10 is a schematic diagram of the user terminal.

For purposes of illustration and not of limitation, an example of a representative user terminal capable of carrying out operations in accordance with the exemplary embodiments is illustrated in FIG. 10. It should be recognized, however, that the principles of the present exemplary embodiments are equally applicable to standard computing systems.

The exemplary arrangement 1000 may include a processing/control unit 1002, such as a microprocessor, reduced instruction set computer (RISC), or other central processing module. The processing unit 1002 need not be a single device, and may include one or more processors. For example, the processing unit 1002 may include a master processor and associated slave processors coupled to communicate with the master processor.

The processing unit 1002 may control the basic functions of the mobile terminal as dictated by programs available in the storage/memory 1004. Thus, the processing unit 1002 may execute the functions described in FIGS. 2 to 6. More particularly, the storage/memory 1004 may include an operating system and program modules for carrying out functions and applications on the mobile terminal. For example, the program storage may include one or more of read-only memory (ROM), flash ROM, programmable and/or erasable ROM, random access memory (RAM), subscriber interface module (SIM), wireless interface module (WIM), smart card, or other removable memory device, etc. The program modules and associated features may also be transmitted to the mobile computing arrangement 1000 via data signals, such as being downloaded electronically via a network, such as the Internet.

One of the programs that may be stored in the storage/memory 1004 is a specific program 1006. As previously described, the specific program 1006 may interact with the interface 38 to select measurements associated with a certain ID or initiated within the user terminal and direct those measurements to a desired location within the user terminal. The program 1006 and associated features may be implemented in software and/or firmware operable by way of the processor 1002. The program storage/memory 1004 may also be used to store data 1008, such as the various authentication rules, or other data associated with the present exemplary embodiments. In one exemplary embodiment, the programs 1006 and data 1008 are stored in non-volatile electrically-erasable, programmable ROM (EEPROM), flash ROM, etc. so that the information is not lost upon power down of the mobile terminal 1000.

The processor 1002 may also be coupled to user interface 1010 elements associated with the mobile terminal. The user interface 1010 of the mobile terminal may include, for example, a display 1012 such as a liquid crystal display, a keypad 1014, speaker 1016, and a microphone 1018. These and other user interface components are coupled to the processor 1002 as is known in the art. The keypad 1014 may include alpha-numeric keys for performing a variety of functions, including dialing numbers and executing operations assigned to one or more keys. Alternatively, other user interface mechanisms may be employed, such as voice commands, switches, touch pad/screen, graphical user interface using a pointing device, trackball, joystick, or any other user interface mechanism.

The mobile computing arrangement 1000 may also include a digital signal processor (DSP) 1020. The DSP 1020 may perform a variety of functions, including analog-to-digital (A/D) conversion, digital-to-analog (D/A) conversion, speech coding/decoding, encryption/decryption, error detection and correction, bit stream translation, filtering, etc. The transceiver 1022, generally coupled to an antenna 1024, may transmit and receive the radio signals associated with a wireless device.

The mobile computing arrangement 1000 of FIG. 10 is provided as a representative example of a computing environment in which the principles of the present exemplary embodiments may be applied. From the description provided herein, those skilled in the art will appreciate that the present invention is equally applicable in a variety of other currently known and future mobile and fixed computing environments. For example, the specific application 1006 and associated features, and data 1008, may be stored in a variety of manners, may be operable on a variety of processing devices, and may be operable in mobile devices having additional, fewer, or different supporting circuitry and user interface mechanisms. It is noted that the principles of the present exemplary embodiments are equally applicable to non-mobile terminals, i.e., landline computing systems.

Numerous variations of the afore-described exemplary embodiments are contemplated. The above-described exemplary embodiments are intended to be illustrative in all respects, rather than restrictive, of the present invention. Thus the present invention is capable of many variations in detailed implementation that can be derived from the description contained herein by a person skilled in the art. All such variations and modifications are considered to be within the scope and spirit of the present invention as defined by the following claims. No element, act, or instruction used in the description of the present application should be construed as critical or essential to the invention unless explicitly described as such. Also, used herein, the article "a" is intended to include one or more items.

The invention claimed is:

1. A method in a user terminal served by a communication network, for collecting, in addition to position information requested by the communication network, additional position related information, the method comprising:
    initiating, by generating a message within the user terminal independently of any instructions received from the communication network, collection of the additional position related information, wherein the additional position related information includes information based on which a physical location of the user terminal is determined, and wherein the message includes a measurement identity reserved for user terminal initiated measurement orders;
    measuring, by the user terminal, at least one parameter related to the physical location of the user terminal in response to the message, wherein the additional position related information is obtained as a result from the measurement of the at least one parameter;
    producing, within the user terminal, measurement reports that include the additional position related information, wherein one or more of said measurement reports are produced in response to the message generated by the user terminal;
    selecting, within the user terminal, based on the measurement identity reserved for user terminal initiated measurement orders, the one or more measurement reports that were produced in response to the message generated by the user terminal;
    reporting the one or more measurement reports to an interface within the user terminal; and
    transmitting, from the interface, the reported one or more measurement reports to an external server or to the communication network.

2. The method of claim 1, wherein the additional position related information comprises at least one of a result of SFN-SFN type 1 and 2 measurements, a result of E-OTD measurements, and/or a result of inter-radio access technology, "inter-RAT", measurements.

3. The method of claim 1, wherein the initiating step comprises: injecting the message, generated by a message generator or by the interface of the user terminal, into a stream of messages received by the user terminal from the communication network.

4. The method of claim 1, further comprising:
    measuring, by the user terminal, another parameter related to the physical location of the user terminal in response to a request from the communication network, wherein the another parameter is one of a cell ID, broadcast information received by the user terminal from a cell, quantized path loss of a received signal, signal strength, quantized noise rise, radio connection information, and quantized time.

5. The method of claim 4, wherein the reporting step comprises:
    reporting, to the interface only, the one or more measurement reports produced in response to the message; and
    reporting measurements of the another parameter only to the communication network.

6. The method of claim 1, wherein the at least one parameter is related to SFN-SFN type 1 or 2 measurements, E-OTD measurements, or inter-radio access technology measurements.

7. The method of claim 1, wherein the position information, which includes assisted global positioning information, and the additional position related information are collected simultaneously and sent together to the external server or communication network so as to enable the external server or the communication network to build a database of fingerprinted positions.

8. The method of claim 1, further comprising:
determining the physical position of the user terminal in the external server, based only on the additional position related information transmitted from the user terminal.

9. The method of claim 1, wherein the position information requested by the communication network is Assisted Global Positioning System, "A-GPS", position information.

10. The method of claim 1, further comprising:
measuring the at least one parameter when receiving the message generated within the user terminal and when receiving a message from the communication network.

11. A user terminal configured to collect, in addition to position information requested by a communication network, additional position related information, the user terminal being served by the communication network, the user terminal comprising:
a processor configured to
initiate, by generating a message independently of any instructions received from the communication network, collection of the additional position related information, wherein the additional position related information includes information based on which a physical location of the user terminal is determined, and wherein the message includes a measurement identity reserved for user terminal initiated measurement orders,
instruct a measuring unit to measure at least one parameter related to the physical location of the user terminal in response to the message, wherein the additional position related information is obtained as a result from the measurement of the at least one parameter,
generate measurement reports that include the additional position related information, wherein one or more of said measurement reports are produced in response to the message generated by the user terminal,
instruct a selecting unit to select, based on the measurement identity reserved for user terminal initiated measurement orders, the one or more measurement reports that were produced in response to the message generated by the user terminal, and report the one or more measurement reports to an interface within the user terminal; and
a transceiver connected to the processor and configured to transmit the reported one or more measurement reports to an external server or to the communication network.

12. The user terminal of claim 11, wherein the additional position related information comprises at least one of a result of SFN-SFN type 1 and 2 measurements, a result of E-OTD measurements, and/or a result of inter-radio access technology, "inter-RAT", measurements.

13. The user terminal of claim 11, further comprising:
a generation unit configured to generate and inject the message into a stream of messages received by the user terminal from the communication network.

14. The user terminal of claim 11, wherein the interface is configured to generate and inject the message into a stream of messages received by the user terminal from the communication network.

15. The user terminal of claim 11, wherein the processor is further configured to instruct the measuring unit to measure another parameter related to the physical location of the user terminal in response to a request from the communication network, wherein the another parameter is one of a cell ID, broadcast information received by the user terminal from a cell, quantized path loss of a received signal, signal strength, quantized noise rise, radio connection information, and quantized time.

16. The user terminal of claim 15, wherein the processor is further configured to report, to the interface only, the one or more measurement reports produced in response to the message; and
report measurements of the another parameter only to the communication network.

17. The user terminal of claim 11, wherein the at least one parameter is related to SFN-SFN type 1 and/or 2 measurements, E-OTD measurements, or inter-radio access technology measurements.

18. The user terminal of claim 11, wherein the processor is configured to collect the position information, which includes assisted global positioning information, and the additional position related information simultaneously, and wherein the transceiver is configured to send the position information and the additional position related information together to the external server or communication network so as to enable the external server or the communication network to build a database of fingerprinted positions.

19. The user terminal of claim 11, wherein the external server determines the physical position of the user terminal based only on the additional position related information transmitted from the user terminal.

20. The user terminal of claim 11, wherein the measuring unit is configured to measure the at least one parameter when receiving the message generated within the user terminal and when receiving a message from the communication network.

21. A non-transitory computer readable medium for storing instructions, wherein the instructions, when executed by a processor in a user terminal served by a communication network, cause the processor to collect, in addition to position information requested by the communication network, additional position related information, the instructions comprising: initiating, by generating a message within the user terminal, independently of any instructions received from the communication network, collection of the additional position related information, wherein the additional position related information includes information based on which a physical location of the user terminal is determined and wherein the message includes a measurement identity reserved for user terminal initiated measurement orders; measuring, by the user terminal, at least one parameter related to the physical location of the user terminal in response to the message and wherein the message includes a measurement identity reserved for user terminal initiated measurement orders; producing, within the user terminal, measurement reports that include the at additional position related information wherein one or more of said measurement reports are produced in response to the message generated by the user terminal selecting, within the user terminal and based on a measurement identity reserved for user terminal initiated measurement orders, one or more measurement reports that were produced in response to the message generated by the user terminal;

reporting the one or more measurement reports to an interface within the user terminal; and transmitting, from the interface, the reported one or more measurement reports to an external server or to the communication network".

22. The non-transitory computer readable medium of claim 21, wherein the additional position related information comprises at least one of a result of SFN-SFN type 1 and 2 measurements, a result of E-OTD measurements, and/or a result of inter-radio access technology, inter-RAT", measurements.

23. The non-transitory computer readable medium of claim 21, further comprising: measuring, by the user terminal, another parameter related to the physical location of the user terminal in response to a request from the communication network, wherein the another parameter is one of a cell ID, broadcast information received by the user terminal from a cell, quantized path loss of a received signal, signal strength, quantized noise rise, radio connection information, and quantized time.

24. The non-transitory computer readable medium of claim 21, wherein the at least one parameter is related to SFN-SFN type 1 or 2 measurements, E-OTD measurements, or inter-radio access technology measurements.

25. The non-transitory computer readable medium of claim 21, wherein the position information, which includes assisted global positioning information, and the additional position related information are collected simultaneously and sent together to the external server or communication network so as to enable the external server or the communication network to build a database of fingerprinted positions.

* * * * *

UNITED STATES PATENT AND TRADEMARK OFFICE
CERTIFICATE OF CORRECTION

PATENT NO. : 8,611,922 B2  
APPLICATION NO. : 12/864023  
DATED : December 17, 2013  
INVENTOR(S) : Wigren et al.

Page 1 of 1

It is certified that error appears in the above-identified patent and that said Letters Patent is hereby corrected as shown below:

In the Specification

Column 1, Line 67, delete "multiple acces" and insert -- multiple access --, therefor.

Column 8, Line 67, delete "identifier 102," and insert -- identifier ID2, --, therefor.

In the Claims

Column 14, Line 61, in Claim 21, delete "include the at" and insert -- include the --, therefor.

Column 15, Line 4, in Claim 21, delete "network"." and insert -- network. --, therefor.

Signed and Sealed this
Fifteenth Day of July, 2014

Michelle K. Lee
*Deputy Director of the United States Patent and Trademark Office*